UNITED STATES PATENT OFFICE.

WILLIAM J. HOUGH, OF TOLEDO, OHIO.

PROCESS OF RECOVERING RESINOUS MATTER.

No. 931,606.

Specification of Letters Patent.

Patented Aug. 17, 1909.

Application filed May 3, 1909. Serial No. 493,680.

*To all whom it may concern:*

Be it known that I, WILLIAM J. HOUGH, residing at Toledo, in the county of Lucas and State of Ohio, have invented certain new and useful Improvements in Processes of Recovering Resinous Matter, of which the following is a specification.

This invention relates to a method of treating a mixture of a solution of ligneous matter with resinous matter and liberated cellulose, whereby each is made available for utilization.

The process involves the liberation of the cellulose of vegetable fibrous material containing resin, by the action of chemical solutions upon the material; the reproduction from the chemical solution of the original resinous matter, or a product of its further manipulation; the production of oil and of gas from the ligneous matter; and finally recovering the alkali in case the chemical solution is an alkali compound. Inasmuch as the art to which this invention refers consists of a number of related and sequential operations, the present invention may be best understood from an explanation of these individual steps. Accordingly I will proceed in this specification to set forth the separate consecutive steps as actually practiced, beginning with the provision of the raw material to be treated and ending with the recovery of most of the reagent that has been employed, and explaining particularly the one of said processes which constitutes my present invention.

Vegetable fibrous material may be said to consist substantially of moisture and insoluble cellulose, soluble ligneous substances, and in many cases resin or oleo-resin. In this specification all the organic constituents of the fibrous material aside from the cellulose and resin, or oleo-resin, will be termed ligneous matter, for the sake of brevity.

*Treatment of the vegetable fibrous material containing resin to separate it into resinous matter, ligneous matter, and cellulose.*—The fibrous material is treated according to the ordinary processes for the manufacture of wood pulp, as by a hot alkali solution. In the process of digestion the resinous matter and the ligneous matter are so affected by the chemical used that they are liquefied, while the cellulose remains practically unaltered as a solid. As the next step in the process I separate the cellulose, or pulp, the resinous matter, and the alkali solution containing the ligneous matter, and treat the two latter separately as hereinafter described.

*Separation of the resinous matter, ligneous matter, and cellulose.*—In the process of digestion the resinous matter and ligneous matter are liquefied, while the cellulose remains as a solid. I now separate the cellulose from the other two major constituents of the wood, by drawing off the liquid or by a filtering operation. In this solution the ligneous matter remains permanently dissolved, while the resinous matter, now in the form of an alkali compound, or resinate, separates from the solution in the solid state on standing, and may then be removed. Instead of separating from the insoluble cellulose both the liquefied resinous matter and ligneous matter contained in the solution, I may allow the resinous matter to separate and solidify while in contact with the cellulose, and then draw off the solution now containing practically none of the resin, recovering the resinous matter from the pulp as by a subsequent washing. Upon standing, the dissolved resinous matter is precipitated, a portion settling to the bottom, while another portion remains on top, and some is held in suspension. I may separate the solid resinates on top by any of the usual methods, then separate the remaining solid resinous matter with the cellulose, draw off the solution containing the ligneous matter, and then recover the resinous matter in contact with the cellulose from the cellulose by washing.

It is to be understood that I do not limit myself to any particular method of separation, the invention contemplating broadly the separation of the resinous matter from other non-cellulose matter, and of the separation of resinous matter from a solution containing other non-cellulose matter and pulp.

*Utilization of the resinous matter.*—The resinous matter recovered as above described from a solution resulting from an alkali treatment of fibrous material containing resin, is obtained in the form of alkali compounds of resin, called resinates, which I may use directly as soap; or which I preferably purify from coloring matter; or I may obtain by treatment of the alkaline resinous matter with acids, free resin, which is a very valuable product. The alkaline resinous matter I may also utilize for the manufacture of valuable oils by distilling it destructively; in so doing I recover the alkali combined in it.

*Utilization of the vegetable matter other than cellulose or resinous matter.*—The liquid containing the extracted ligneous matter, and from which the resinous matter has been separated, is now concentrated as in the ordinary processes, by evaporating from it the major part of the water contained. I now subject the resulting concentrated liquid to a destructive distillation, by which means I recover from it gas and oils, which are produced by the action of heat alone, and at the same time the alkali which was contained in the liquid remains in the still, and this alkali is purified and prepared for further use by the ordinary process of lixiviation, etc. If it is desired, the highly concentrated liquid before being destructively distilled, may be deprived of all the water which it contains by a further heating, as in open pans for instance.

The oil which I obtain from the ligneous matter is a valuable commercial product, which, among its other uses, is particularly of service as a wood preservative. The gas produced may be utilized to furnish heat for the reaction or for any other desired purpose. The impure alkali remaining in the still may be rendered liquid by heat, and then withdrawn for purification.

The ordinary processes for obtaining cellulose from wood by chemical means are subject to a number of inconveniences and losses; if, for instance, the chemical used for the treatment of the wood is caustic soda or a bisulfite, no product of value is obtained except the cellulose; the rest of the wood has heretofore been wasted and the unused and wasted part of the wood, amounting in most cases to at least as much as the total amount of wood pulp produced, has either been burned up in the incineration of the waste liquor in the soda process or has been allowed to pollute the streams, when a bisulfite process is used. The recovery of the alkali used in the soda or sulfate processes has been accomplished heretofore by evaporating the "spent liquors" to a thick syrupy liquid, which was then fed into an incinerating furnace and the organic matter there destroyed; the impure alkali resulting was then leached, causticized and used on subsequent charges of material. In my process the whole of the fibrous material is utilized to produce valuable products, none of it is converted into noxious gases, and none of it goes to pollute the streams. In the old method considerable loss of alkali is also experienced, because the flame which plays upon the alkali residue in the process of incinerating carries it as waste up the chimney. I experience practically no loss of the alkali which I may use, because the distillation of the waste liquid residue is conducted in a retort.

In the evaporation of the "spent liquors", the resinous matter which may have been contained in the wood caused considerable difficulty and loss by separating as a scum in the evaporators and preventing or rendering very difficult the economical evaporation because of the foaming of the resinous soap. Under my process, in the evaporation of the waste liquor I experience no difficulty from the foaming of resinous matter, because I have already separated it before the evaporation is commenced. I not only remove the cause of difficulty, but utilize it.

It is to be understood that many variations are possible, as regards the different steps employed, the order of their succession, their inclusion or omission, the material treated, and the reagents used, without departing from the contemplated scope of my invention, and I intend no limitations whatsoever, except such as are set forth in the appended claims.

Having described my invention what I claim as new and desire to secure by Letters Patent is:

1. The process of treating a solution of ligneous matter associated with resinous salts, which consists in separating such salts from the solution.

2. The process of treating a mixture of a solution of ligneous matter with resinous salts and liberated cellulose, which consists in separating the resinous salts from the mixture.

3. The process of treating a mixture of a solution of ligneous matter with resinous salts and liberated cellulose, which consists in separating the cellulose from the mixture, and then separating the resinous salts from the residue.

4. The process which consists in treating vegetable fibrous material containing resin with a hot pulping solution and then separating the cellulose, resinous salts, and ligneous matter.

5. The process of treating a mixture of a solution of vegetable matter other than cellulose or resinous matter with resinous salts and liberated cellulose, which consists in allowing the resinous salts to separate and solidify and then separating such salts from the mixture.

6. The process of treating a mixture of a solution of vegetable matter other than cellulose or resinous matter with resinous salts and liberated cellulose, which consists in separating the insoluble cellulose from the mixture, then allowing the resinous salts to separate and solidify, and then separating such salts from the residue.

7. The process of treating a "spent" pulping solution containing resinous salts and vegetable matter other than cellulose or resinous matter which consists in allowing the resinous salts to separate and solidify, and then separating such salts from the solution.

8. The process of treating a "spent" pulping solution containing resinous salts and ligneous matter, which consists in separating the resinous salts from the solution.

9. The process of treating a solution of vegetable matter other than cellulose or resinous matter associated with resinous salts and liberated cellulose, which consists in precipitating the resinous salts, and then separating such salts from the residue.

10. The process of treating a solution of vegetable matter other than cellulose or resinous matter associated with resinous salts and liberated cellulose, which consists in separating the insoluble cellulose from the residue, then precipitating the resinous salts, and then separating such salts from the residue.

11. The process of treating a solution of vegetable matter other than cellulose or resinous matter associated with resinous salts, which consists in precipitating the resinous salts, and then separating such salts from the residue.

12. The process which consists in treating vegetable fibrous material containing resin with a hot pulping solution, and then separating the resinous salts from the residue.

13. The process which consists in treating vegetable fibrous material containing resin with a hot pulping solution, then separating the solution from the cellulose, and then separating the resinous salts from the residue.

14. The process which consists in treating vegetable fibrous material containing resin with a hot pulping solution, then precipitating the resinous salts, and then separating such salts from the residue.

15. The process which consists in treating vegetable fibrous material containing resin with a hot pulping solution, then separating the hot solution from the insoluble cellulose, then precipitating the resinous salts, and then separating such salts from the residue.

16. The process of treating a mixture of a solution of ligneous matter with resinous salts and liberated cellulose, which consists in separating the cellulose and a portion of the resinous salts from the residue, then separating the remaining resinous salts from the residue, then recovering by washing from the cellulose the resinous salts removed with the cellulose, and then separating the resinous salts from the washings.

17. The process of treating a "spent" pulping solution containing resinous salts and ligneous matter, which consists in precipitating the resinous salts, and then separating such salts from the solution.

18. The process of treating a "spent" pulping solution containing resinous salts and ligneous matter, which consists in precipitating the resinous salts by subsidence, and then separating such salts from the solution.

19. The process of treating a "spent" pulping solution containing resinous salts and ligneous matter, which consists in precipitating the resinous salts by cooling, and then separating such salts from the solution.

20. The process of treating a "spent" pulping solution containing resinous salts and ligneous matter, which consists in precipitating the resinous salts by cooling and consequent subsidence, and then separating such salts from the solution.

21. The process of treating a solution of vegetable matter other than cellulose or resinous matter associated with resinous salts and liberated cellulose, which consists in precipitating the resinous salts by subsidence, and then separating such salts from the residue.

22. The process of treating a solution of vegetable matter other than cellulose or resinous matter associated with resinous salts and liberated cellulose, which consists in separating the insoluble cellulose from the residue, then precipitating the resinous salts by subsidence, and then separating such salts from the residue.

23. The process of treating a solution of vegetable matter other than cellulose or resinous matter associated with resinous salts, which consists in precipitating the resinous salts by subsidence, and then separating such salts from the residue.

24. The process of treating a solution of vegetable matter other than cellulose or resinous matter associated with resinous salts and liberated cellulose, which consists in precipitating the resinous salts by cooling and consequent subsidence, and then separating such salts from the residue.

25. The process of treating a solution of vegetable matter other than cellulose or resinous matter associated with resinous salts and liberated cellulose, which consists in separating the insoluble cellulose from the residue, then precipitating the resinous salts by cooling and consequent subsidence, and then separating such salts from the residue.

26. The process of treating a solution of vegetable matter other than cellulose or resinous matter associated with resinous salts, which consists in precipitating the resinous salts by cooling and consequent subsidence, and then separating such salts from the residue.

27. The process which consists in treating vegetable fibrous material containing resin with a hot pulping solution, then separating the hot solution from the insoluble cellulose, then allowing the resinous salts to separate and solidify, and then separating such salts from the residue.

28. The process which consists in treating vegetable fibrous material containing resin with a hot alkaline pulping solution, and then separating the cellulose, the resinous salts, and the ligneous matter.

29. The process which consists in treating vegetable fibrous material containing resin with a hot alkaline pulping solution, then separating the hot solution from the insoluble cellulose, then allowing the resinous salts to separate and solidify, and then separating the resinous salts from the residue.

30. The process which consists in treating vegetable fibrous material containing resin with a hot alkaline pulping solution, then separating the hot solution from the insoluble cellulose, then precipitating the resinous salts by cooling and consequent subsidence, then separating such salts from the residue.

31. The process which consists in treating vegetable fibrous material containing resin with a hot alkaline pulping solution, then precipitating the resinous salts by cooling and consequent subsidence, and then separating such salts from the residue.

32. The process of treating a "spent" alkaline pulping solution containing resinous salts and ligneous matter, which consists in separating the resinous salts from the solution.

33. The process of treating a "spent" alkaline pulping solution containing resinous salts and ligneous matter, which consists in precipitating the resinous salts, and then separating such salts from the solution.

34. The process of treating a "spent" alkaline pulping solution containing resinous salts and ligneous matter, which consists in precipitating the resinous salts by subsidence, and then separating such salts from the solution.

35. The process of treating a "spent" alkaline pulping solution containing resinous salts and ligneous matter, which consists in precipitating the resinous salts by cooling, and then separating such salts from the solution.

36. The process of treating a "spent" alkaline pulping solution containing resinous salts and ligneous matter, which consists in precipitating the resinous salts by cooling and consequent subsidence, and then separating such salts from the solution.

37. The process of treating a "spent" alkaline pulping solution containing resinous salts and vegetable matter other than cellulose or resinous matter, which consists in allowing the resinous salts to separate and solidify, and then separating such salts from the solution.

38. The process of treating a solution of ligneous matter associated with resinous salts, which consists in separating the resinous salts from the residue, then purifying such salts and then treating them with an acid.

39. The process which consists in treating vegetable fibrous material containing resin with a hot pulping solution, then separating the resinous salts, the cellulose, and the ligneous matter, then purifying the resinous salts, and then treating them with an acid.

40. The process of treating a mixture of a solution of ligneous matter with resinous salts and liberated cellulose, which consists in separating the resinous salts from the mixture, then purifying such salts and then treating them with an acid.

41. The process of treating a mixture of a solution of ligneous matter with resinous salts and liberated cellulose, which consists in separating the cellulose from the mixture, then separating the resinous salts from the residue, then purifying such salts, and then treating them with an acid.

42. The process of treating a solution of ligneous matter associated with resinous salts, which consists in separating the resinous salts from the residue, and then treating such salts with an acid.

43. The process of treating a mixture of a solution of ligneous matter associated with resinous salts and liberated cellulose, which consists in separating the resinous salts from the residue, and then treating such salts with an acid.

44. The process of treating a mixture of a solution of ligneous matter associated with resinous salts and liberated cellulose, which consists in separating the cellulose from the residue, then separating the resinous salts from the residue, and then treating such salts with an acid.

45. The process which consists in treating vegetable fibrous material containing resin with a hot pulping solution, then separating the cellulose, the resinous salts, and the ligneous matter, and then treating the resinous salts with an acid.

In witness whereof I affix my signature in the presence of two witnesses.

WILLIAM J. HOUGH.

Witnesses:
FRANK J. KENT,
MARTHA BUSCHER.

It is hereby certified that in Letters Patent No. 931,608, granted August 17, 1909, upon the application of William J. Hough, of Toledo, Ohio, for an improvement in "Processes of Recovering Resinous Matter," errors appear in the printed specification requiring correction, as follows: In line 97, page 1, the word "of" should read *or*, and in line 109, same page, the word "resin" should read *rosin;* and that the said Letters Patent should be read with these corrections therein that the same may conform to the record of the case in the Patent Office.

Signed and sealed this 5th day of October, A. D., 1909.

[SEAL.]

C. C. BILLINGS.
*Acting Commissioner of Patents.* vegetable fibrous material containing resin with a hot alkaline pulping solution, and then separating the cellulose, the resinous salts, and the ligneous matter.

29. The process which consists in treating vegetable fibrous material containing resin with a hot alkaline pulping solution, then separating the hot solution from the insoluble cellulose, then allowing the resinous salts to separate and solidify, and then separating the resinous salts from the residue.

30. The process which consists in treating vegetable fibrous material containing resin with a hot alkaline pulping solution, then separating the hot solution from the insoluble cellulose, then precipitating the resinous salts by cooling and consequent subsidence, then separating such salts from the residue.

31. The process which consists in treating vegetable fibrous material containing resin with a hot alkaline pulping solution, then precipitating the resinous salts by cooling and consequent subsidence, and then separating such salts from the residue.

32. The process of treating a "spent" alkaline pulping solution containing resinous salts and ligneous matter, which consists in separating the resinous salts from the solution.

33. The process of treating a "spent" alkaline pulping solution containing resinous salts and ligneous matter, which consists in precipitating the resinous salts, and then separating such salts from the solution.

34. The process of treating a "spent" alkaline pulping solution containing resinous salts and ligneous matter, which consists in precipitating the resinous salts by subsidence, and then separating such salts from the solution.

35. The process of treating a "spent" alkaline pulping solution containing resinous salts and ligneous matter, which consists in precipitating the resinous salts by cooling, and then separating such salts from the solution.

36. The process of treating a "spent" alkaline pulping solution containing resinous salts and ligneous matter, which consists in precipitating the resinous salts by cooling and consequent subsidence, and then separating such salts from the solution.

37. The process of treating a "spent" alkaline pulping solution containing resinous salts and vegetable matter other than cellulose or resinous matter, which consists in allowing the resinous salts to separate and solidify, and then separating such salts from the solution.

38. The process of treating a solution of ligneous matter associated with resinous salts, which consists in separating the resinous salts from the residue, then purifying such salts and then treating them with an acid.

39. The process which consists in treating vegetable fibrous material containing resin with a hot pulping solution, then separating the resinous salts, the cellulose, and the ligneous matter, then purifying the resinous salts, and then treating them with an acid.

40. The process of treating a mixture of a solution of ligneous matter with resinous salts and liberated cellulose, which consists in separating the resinous salts from the mixture, then purifying such salts and then treating them with an acid.

41. The process of treating a mixture of a solution of ligneous matter with resinous salts and liberated cellulose, which consists in separating the cellulose from the mixture, then separating the resinous salts from the residue, then purifying such salts, and then treating them with an acid.

42. The process of treating a solution of ligneous matter associated with resinous salts, which consists in separating the resinous salts from the residue, and then treating such salts with an acid.

43. The process of treating a mixture of a solution of ligneous matter associated with resinous salts and liberated cellulose, which consists in separating the resinous salts from the residue, and then treating such salts with an acid.

44. The process of treating a mixture of a solution of ligneous matter associated with resinous salts and liberated cellulose, which consists in separating the cellulose from the residue, then separating the resinous salts from the residue, and then treating such salts with an acid.

45. The process which consists in treating vegetable fibrous material containing resin with a hot pulping solution, then separating the cellulose, the resinous salts, and the ligneous matter, and then treating the resinous salts with an acid.

In witness whereof I affix my signature in the presence of two witnesses.

WILLIAM J. HOUGH.

Witnesses:
FRANK J. KENT,
MARTHA BUSCHER.

It is hereby certified that in Letters Patent No. 931,608, granted August 17, 1909, upon the application of William J. Hough, of Toledo, Ohio, for an improvement in "Processes of Recovering Resinous Matter," errors appear in the printed specification requiring correction, as follows: In line 97, page 1, the word "of" should read *or*, and in line 109, same page, the word "resin" should read *rosin;* and that the said Letters Patent should be read with these corrections therein that the same may conform to the record of the case in the Patent Office.

Signed and sealed this 5th day of October, A. D., 1909.

[SEAL.]

C. C. BILLINGS.
*Acting Commissioner of Patents.*

Corrections in Letters Patent No. 931,608.

It is hereby certified that in Letters Patent No. 931,608, granted August 17, 1909, upon the application of William J. Hough, of Toledo, Ohio, for an improvement in "Processes of Recovering Resinous Matter," errors appear in the printed specification requiring correction, as follows: In line 97, page 1, the word "of" should read *or*, and in line 109, same page, the word "resin" should read *rosin;* and that the said Letters Patent should be read with these corrections therein that the same may conform to the record of the case in the Patent Office.

Signed and sealed this 5th day of October, A. D., 1909.

[SEAL.]

C. C. BILLINGS.
*Acting Commissioner of Patents.*